United States Patent [19]

Peszkin et al.

[11] Patent Number: 5,147,936
[45] Date of Patent: Sep. 15, 1992

[54] LLDPE FILMS BY BLENDING WITH SPECIFIC POLYPROPYLENES

[75] Inventors: Perla N. Peszkin, Santa Clara, Calif.; Pradeep P. Shirodkar, Somerset, N.J.

[73] Assignee: Mobil Oil Corporation, Fairfax, Va.

[21] Appl. No.: 681,249

[22] Filed: Apr. 8, 1991

[51] Int. Cl.$^5$ ............................................. C08L 23/12
[52] U.S. Cl. ............................................. 525/240
[58] Field of Search ................................... 525/240

[56] References Cited

U.S. PATENT DOCUMENTS

| | | |
|---|---|---|
| 3,254,139 | 5/1966 | Anderson et al. |
| 3,426,105 | 2/1969 | Christiensen |
| 4,563,504 | 1/1986 | Hert et al. .............. 525/240 |
| 4,565,847 | 1/1986 | Bahl et al. |
| 4,871,813 | 10/1989 | Senez |

FOREIGN PATENT DOCUMENTS

| | | |
|---|---|---|
| 253792 | 1/1988 | European Pat. Off. |
| 58-217534 | 12/1983 | Japan |
| 59-041342 | 3/1984 | Japan |
| 59-202244 | 11/1984 | Japan |
| 60-161442 | 8/1985 | Japan |

*Primary Examiner*—Carman J. Seccuro, Jr.
*Attorney, Agent, or Firm*—Alexander J. McKillop; Charles J. Speciale; Marina V. Schneller

[57] ABSTRACT

A polymer blend including from about 80 to about 98 weight percent LLDPE and from about 2 to about 20 weight percent PP having an isotacticity of from about 70 to 90 percent, the blend having a viscosity ratio of LLDPE to PP greater than 3, improves the processability of LLPDE into films without loss in film properties.

16 Claims, No Drawings

LLDPE FILMS BY BLENDING WITH SPECIFIC POLYPROPYLENES

BACKGROUND OF THE INVENTION

This invention relates to blends of linear low density polyethylene (LLDPE) and polypropylene (PP) and to a method for improving the processability of linear low density polyethylene (LLDPE) in extruding films by blending a minor amount of polypropylene (PP) having a moderate amount of atacticity with the LLDPE and extruding the blend to obtain a blown film.

Linear low and medium density polyethylene polymers are widely used commercially in films which are conventionally prepared by blown film extrusion. Because of the structure and rheology of LLDPE, it is more viscous at extrusion shear rates and requires more power to extrude than low density polyethylene (LDPE). A wide die gap has also generally been used in extrusion to avoid melt fracture. It has also been known that polypropylene can improve the stiffness of LLDPE. Adding polypropylene, however, has been known to adversely affect impact properties and tear strength of LLDPE films.

U.S. Pat. No. 4,871,813 describes blown films with good hot tack strength during heat sealing, made with a composition of 99 to 75 weight percent LLDPE and 1 to 25 weight percent of polypropylene copolymers having a fusion enthalpy equal to or lower than 75 J/g, that is, a degree of crystallinity or isotacticity lower than 35%, and a degree of atacticity higher than 65%. The required polypropylene copolymers are highly specific and the use of polypropylene homopolymer to improve processability of LLDPE is not suggested. The fusion enthalpy of the copolymer is described as a characteristic connected with the molecular structure of the copolymer, higher in proportion as the structure is more ordered so that the fusion enthalpy of a purely isotactic polypropylene would be 210 J/g. In contrast, in the present invention, the PP has a much higher isotacticity of about 70–90%.

U.S. Pat. No. 4,565,847 describes a blend of LLDPE, PP and ethylene-propylene diene monomer copolymer (EPDM) or ethylene-propylene rubber (EPR). When LLDPE/PP alone was used to prepare films, the films exhibited a catastrophic decrease in impact and tear strength, particularly in the machine direction (MD).

U.S. Pat. No. 3,254,139 describes wire coating blends of linear polypropylene and linear ethylene polymers. The polyethylenes are low density branched polyethylenes or high density unbranched polyethylenes. There is no suggestion of LLDPE or that isotacticity of polypropylene is a factor which requires careful selection. In addition, in wire coatings, properties such as impact and stiffness are not important. In contrast, it has now been found that to attain a desired balance of extrudability and property enhancement, the correct isotacticity index of polypropylene is an important factor particularly in blown films where extrudability, impact and stiffness are of great significance.

U.S. Pat. No. 3,426,105 describes a blow molding composition of a high density polyethylene (HDPE) copolymer of ethylene and 1-butene having a density of 0.945 to 0.955 and a polypropylene having a density of about 0.903 to 0.915. The described composition is useful for molded articles and is unsuitable for blown films.

Japan Patent No. 49041342-A describes a blow molding composition containing LLDPE and polypropylene having a ratio of the melt flow index of polypropylene to the melt flow index of polyethylene between 1.0 and 3.0. Because of the disclosed melt indices, the blow molding composition described in the Japan patent would have a viscosity which would make it unsuitable for blown films. It is known that the melt index indicates the viscosity of a thermoplastic polymer at a specified temperature and pressure. Specifically, the melt index may be generally defined as the number of grams of the polymer which can be forced through a 0.0825 inch orifice in 10 minutes at 190° C. by a pressure of 2160 g. Blow molding as in the Japan patent is generally used to form rigid hollow objects such as bottles. Rigid articles require higher viscosity materials.

The prior art discussed above has suggested various kinds of blends of polyethylene and propylene but all of the described blends are unsuitable for improving the processability of blown films. In addition, various methods have been suggested for improving the processability and properties of blown films using ternary blends in which other components have been necessary in addition to LLDPE and PP. When attempts were made to use LLDPE and PP alone for improving the properties and processability of blown film blends, the results described in the prior art were not advantageous.

According, a method for improving the processability of blown films without necessity of forming ternary blends would be economically advantageous.

It is an object of the invention to improve the processability of LLDPE blown films by a judicious selection of the properties of the polypropylene and LLDPE components of a film blend.

It is a specific object of the invention to provide a blend which can be extruded into blown films with a minimum of pressure while yielding films with good properties.

SUMMARY OF THE INVENTION

This and other objects are achieved by providing a polymer blend comprising from about 80 to about 98 weight percent linear low density polyethylene (LLDPE) and from about 2 to about 20 weight percent polypropylene homopolymer having an isotacticity of from about 70 to about 90 percent. The blend preferably has a viscosity ratio of LLDPE to PP greater than about 3.

The blending of PP having a moderate amount of atacticity with LLDPE improves the processability of the LLDPE during extrusion without loss in film properties of MD tear resistance and impact.

For a better understanding of the present invention together with other and further objects, reference is made to the following description, and its scope will be pointed out in the appended claims.

DETAILED DESCRIPTION OF THE INVENTION

The linear ethylene polymers which are suitable for use in this invention include known materials which are widely commercially available. The preparation of an example of a suitable polymer is described in U.S. Pat. No. 4,076,698 which is incorporated herein by reference.

Suitable LLDPE's include homopolymers of ethylene or copolymers of ethylene and alpha olefins containing 4 to 10 carbon atoms. This invention is particularly concerned with linear low density polymers which are copolymers generally having a density between 0.90 and 0.94, preferably between 0.91 and 0.93. Preferred LLDPE's have a viscosity of from about 1E4 to about 2E5 poises.

The ethylene polymers may contain a minor amount of from about 2% to about 20% by weight of at least one alpha-olefin comonomer selected from the group consisting of propylene, 1-butene, 1-isobutene, 1-pentene, 1-isopentene, 1-hexene, 1-isohexene, 1-heptene, 1-isoheptene, 1-octene, 1-isooctene, 1-nonene, 1-isononene, 1-decene, 1-isodecene, and the like. The amount of comonomers used is enough to result in polymer densities in the range of about 0.90–0.94 gms./cc. The instant copolymers are also characterized as having a melt index (melt flow) in the range of about 0.2 to about 20 gms/10 min. and preferably 0.2 to 2.0 gms/10 min. as measured by ASTM-D-1238 condition (E). LLDPE is also commercially available.

The polypropylene referred to herein includes known homopolymer in this class. The polypropylene homopolymer is selected for its ability to improve processability of LLDPE producing films with improved properties. Suitable polypropylenes have a melt index from about 1 to about 20 g/10 min. and a density of less than about 0.91.

The order and regularity of propylene monomers in polypropylene control the properties of the polymer. The repeating monomers of homopolymer propylene have the formula:

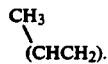

The properties of a polypropylene vary according to whether the polypropylene is a homopolymer or copolymer. Suitable herein is the homopolymer.

The end of the molecule with the —$CH_3$ group is called the head and the other end is called the tail. When the monomers are linked with stereoregularity, that is head to tail, the polymer is isotactic and crystalline. When the polymer includes monomers linked head to head, a degree of atacticity exists in the polymer. Normally polypropylene is about 95% isotactic. Commercial polypropylene is essentially isotactic. Polypropylenes useful in the present invention have an isotacticity of less than 95%, preferably less than 90% and more preferably from about between 70 to about 90% with an atacticity from about 10 to about 30%.

The degree of isotacticity of a polymer is directly proportional to its fusion enthalpy. A polymer with a higher degree of isotacticity has a greater fusion enthalpy.

An important property of the polymer is its viscosity. The term viscosity refers to the complex viscosity measured during the dynamic oscillatory test in the parallel plate geometry using the Rheometrics System IV rheometer. The measurements herein were done at a frequency of 0.1 rad/sec., at 220° C. and with a strain of 10 percent. The Cox-Merz empirical rule has shown that the complex viscosity measured at a given frequency is an accurate measure of the shear viscosity of the polymer melt at that shear rate.

The viscosity of a polymer is related to molecular weight chain length and chain branching. Suitable PP's for use herein have a viscosity of about 1E4 to 2E5 poises and have a melt index (MI) such that the ratio of the MI of the PP relative to the MI of the LLDPE is greater than 3. In addition, the viscosity ratio of the LLDPE to PP is greater than 3.

Additionally, the suitable polypropylenes have a relatively narrow molecular weight distribution as specified by the rheological measurement of the crossover modulus. The modulus of the polymer melt at the frequency at which the storage modulus is equal in magnitude to the loss modulus is called the cross-over modulus. Zeichner and Patel (Proc. 2nd World Congress Chem. Eng., Vol. 6, p 373, Montreal 1981) found an excellent inverse correlation between the crossover modulus and the Mw/Mn of a series of polypropylenes. Thus, higher the crossover modulus, the narrower the MWD of the polypropylene. The measurements are done in the same manner as discussed in the section on viscosity. The crossover modulus of the polypropylene herein is preferably from about 2E5 to about 1E6 poises.

The processability of LLDPE and the properties of LLDPE films are improved with the present invention. The LLDPE/PP blend may be extruded into blown or cast film and oriented with a ratio of the initial thickness at the die gap to the final film thickness of from about 10 to about 500.

Preferably the blend is extruded into blown film using conventional techniques to obtain films which are generally from about 0.5 to 5 mils in thickness. In extruding blown film, the die shapes the polymer into a tube. The tube is blown up into a bubble that draws down the tube to the required gauge. The ratio of the diameter of the blown bubble to the diameter of the die is the blow-up ratio. The film may be used in tubular form, for example for bags, or slit to form flat film.

EXAMPLE 1

The properties of polypropylenes designated A,B and C and LLDPE were determined. Polypropylene A is commercially available from Shell Chemical Company, Houston, Texas under the designation DX5097. Polypropylene B is commercially available from Amoco Chemical Company, Chicago, Ill. under the designation PP7232. Polypropylene C is commercially available from BASG A.G. Ludwigshafen, Germany under the designation NOV 1400. The LLDPE is commercially available from Mobil Chemicals under the designation NTA-101. The properties of the polymers were determined to be as set forth in Table I below.

TABLE I

| RESIN | PP/A | PP/B | PP/C | LLDPE |
|---|---|---|---|---|
| Melt Index | 4.5 | 12 | 9.3 | 1 |
| Density | .905 | .9 | <.9 | .918 |
| Fusion Enthalpy, cal/gm | 22.12 | 22.18 | 14.83 | — |
| % Isotacticity | 94.4 | 95.7 | 79.6 | — |
| Viscosity, poises | 7.0E4 | 3.3E4 | 2.08E4 | 6.8E4 |
| Cross-over modulus, poises | 1.94E5 | 1.86E5 | 4.18E5 | — |
| Cross-over modulus, frequency | 2.00E1 | 5.43E1 | 1.19E2 | — |

Notes
(1) Isotacticity measured by C13 NMR
(2) Viscosity and cross-over dynamic rheological properties measured on the Rheometrics System IV, under parallel-plate geometry at 220° C. and 10% strain.
geometry at 220° C. and 10% strain.

EXAMPLE 2

Extrusion blown films were prepared from LLDPE and LLDPE/PP blends in the indicated weight percent ratios. One mil films were extruded using a 2.5 inch extruder at 113 lbs/hr, 2:5:1 BUR, 20 inch frostline height at 400° F. melt temperature and with 80 mils die gap and a 6 inch die. The screw tip pressure and motor amps were determined and the films measured for tear strength and dart drop impact as set forth in Table II below.

TABLE II

|  | LLDPE Control | LLDPE + 5% PP/A | LLDPE + 5% PP/C |
| --- | --- | --- | --- |
| Screw Tip Pressure, psig | 3040 | 2650 | 2790 |
| Motor Amps | 43 | 36 | 36 |
| MD Tear, gms/mil | 297 | 247 | 281 |
| Dart Drop Impact, $F_{50}$ grams | 147 | 129 | 142 |

EXAMPLE 3

Films were prepared as in Example 2 except that the extrusion rate was 150 lbs/hr, with a 26 inch frostline height and a 450° F. melt temperature. The results are shown in Table III below.

TABLE III

|  | LLDPE Control | LLDPE + 5% PP/B | LLDPE + 5% PP/C |
| --- | --- | --- | --- |
| Screw Tip Pressure, psig | 2570 | 2270 | 2360 |
| Motor Amps | 47 | 41 | 42 |
| MD Tear, gms/mil | 374 | 279 | 364 |
| Spencer Impact, gms/mil | 1430 | 1090 | 1440 |

Polypropylene PP/C is a homopolymer characterized by a lower degree of isotacticity and a lower degree of crystallinity as compared with polypropylenes PP/A and PP/B. The results in Tables I and II show that the addition of a polypropylene having a moderate degree of atacticity improves the processability of LLDPE during extrusion without loss in MD tear and impact properties. On the other hand, the addition of polypropylenes PP/A and PP/B having low atacticity improved processing but resulted in unacceptable losses in film properties.

EXAMPLE 4

Differences in behavior were determined between homopolymer and a copolymer polypropylene blended with LLDPE. A polypropylene copolymer (PP/D) FINA8573 (FINA Oil and Chemical Co., Cosden Div., Dallas, Texas) was compared with preferred homopolymer Novalene 1400 (PP/C). The properties of PP/D are as follows:
MI = 7 g/10 min
density = 0.90
composition = 5.4% Ethylene, 94.6% propylene
isotacticity = 87.2%
$\Delta Hf$ = 17.3 cal/g
Dry blends of the specified composition were extruded into film using the conditions outlined in Example 2. The resulting processing and film properties are set forth in Table IV below:

TABLE IV

|  | LLDPE Control | LLDPE + 5% PP/D | LLDPE + 5% PP/C |
| --- | --- | --- | --- |
| Screw tip pressure, psig | 2740 | 2430 | 2520 |
| Motor amps. | 41.5 | 34 | 38 |
| MD Tear, gms/mil | 286 | 249 | 324 |
| Dart Drop, F50 gms | 89 | 55 | 150 |

This example clearly shows that contrary to U.S. Pat. No. 4,871,813 the homopolymer Nov. 1400 gives superior properties to the copolymer Fina 8547.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A polymer blend comprising from about 2 to about 20 weight percent polypropylene (PP) homopolymer having an isotaciticity of from about 70% to about 90% and a cross-over modulus of from about 2E5 to about 1E6 poises and from about 98 to about 80 weight percent linear low density polyethylene (LLDPE) the blend having a viscosity ratio of LLDPE to PP greater than about 3 and a ratio of melt index (MI) of PP to melt index (MI) of LLDPE greater than 3.

2. The blend of claim 1 wherein the LLDPE has a density of from about 0.9 to about 0.94.

3. The blend of claim 1 wherein the LLDPE has a melt index from about 0.2 to about 20 g/10 min.

4. The blend of claim 1 wherein the LLDPE has a viscosity from about 1E4 poises to about 2E5 poises.

5. The blend of claim 1 wherein the PP has a density of less than about 0.91.

6. The blend of claim 1 wherein the PP has a melt index of from about 1 to about 20 g/10 min.

7. The blend of claim 1 wherein the PP has a viscosity of from about 1E4 to about 2E5 poises.

8. A film of the blend of claim 1.

9. A method for improving thermoplastic polymer films comprising blending from about 2 to about 20 weight percent polypropylene (PP) homopolymer having an isotacitity of from about 70% to about 90% and a crossover modulus of from about 2E5 to about 1E6 poises and from about 98 to about 80 weight percent linear low density polyethylene (LLDPE) to form a blend having a viscosity ratio of LLDPE to PP greater than about 3 and a ratio of melt index (MI) of PP to melt index (MI) of LLDPE greater than 3.

10. The method of claim 9 wherein the LLDPE has density of from about 0.9 to about 0.94.

11. The method of claim 9 wherein the LLDPE has a melt index from about 0.2 to about 20 g/10 min.

12. The method of claim 9 wherein the LLDPE has a viscosity from about 1E4 poises to about 2E5 poises.

13. The method of claim 9 wherein the PP has a density of less than about 0.91.

14. The method of claim 9 wherein the PP has a melt index of from about 1 to about 20 g/10 min.

15. The method of claim 9 wherein the PP has a viscosity of from about 1E4 to about 2E5 poises.

16. The method of claim 9 wherein the film is a blown film.

* * * * *